United States Patent [19]

Iwatani et al.

[11] Patent Number: 4,914,374
[45] Date of Patent: Apr. 3, 1990

[54] VOLTAGE REGULATOR FOR AC GENERATOR WITH CONSTANT INTERRUPTION FREQUENCY

[75] Inventors: Shiro Iwatani; Hirofumi Watanabe, both of Himeji, Japan

[73] Assignee: Mitsubishi Denki Kabushiki Kaisha, Tokyo, Japan

[21] Appl. No.: 306,421

[22] Filed: Feb. 6, 1989

[30] Foreign Application Priority Data

Feb. 24, 1988 [JP] Japan .................................. 63-41075

[51] Int. Cl.$^4$ ............................ H02J 7/16; H02P 9/30
[52] U.S. Cl. ........................................ 322/28; 322/73; 361/21
[58] Field of Search ....................... 322/22, 24, 25, 27, 322/28, 72, 73; 361/20, 21

[56] References Cited

U.S. PATENT DOCUMENTS

| | | | |
|---|---|---|---|
| 3,820,009 | 6/1974 | Itoh et al. | 322/28 |
| 4,310,792 | 1/1982 | Iwatani et al. | 322/73 X |
| 4,349,854 | 9/1982 | Mori et al. | 361/21 |
| 4,570,198 | 2/1986 | Storti et al. | 322/27 X |

FOREIGN PATENT DOCUMENTS

2339157 ·2/1974 Fed. Rep. of Germany ........ 322/28

Primary Examiner—Peter S. Wong
Assistant Examiner—Kristine Peckman
Attorney, Agent, or Firm—Sughrue, Mion, Zinn, MacPeak & Seas

[57] ABSTRACT

A voltage regulator circuit for an AC generator is disclosed which comprises a holding circuit for holding the power transistor, which is coupled in series with the field winding of the generator, in the non-conductive state after the Zener diode of the voltage detecting circuit is turned off, and a releasing circuit for releasing the holding action of the holding circuit periodically at a predetermined interval. The holding circuit includes a pair of transistors turned on and off in phase and in antiphase with the power transistor, respectively, the transistor in antiphase, when conductive, holding the power transistor in the non-conductive state. The releasing circuit, on the other hand, includes a pulse generator for generating trigger pulses periodically at a predetermined interval, and a transistor which is turned on by these trigger pulses to turn off the transistor in antiphase holding the power transistor in the non-conductive state. The interruption frequency of the excitation current, i.e., the frequency of turning on and off of the power transistor, is equal to the frequency of releasing actions of the releasing circuit occurring at said predetermined interval.

4 Claims, 2 Drawing Sheets

VOLTAGE REGULATOR FOR AC GENERATOR WITH CONSTANT INTERRUPTION FREQUENCY

BACKGROUND OF THE INVENTION

1. Field of the Invention

This invention relates to a voltage regulator circuit which, by interrupting the excitation current supplied to the field winding of a generator, regulates the output voltage of the generator to a predetermined level.

2. Description of the Related Art

Automobiles are generally provided with an AC generator the output of which is rectified by a rectifier circuit and is regulated to a predetermined voltage level by a voltage regulator circuit. In such a case, the voltage regulator circuit regulates the output voltage by interrupting the excitation current supplied to the field winding of the generator when the output voltage exceeds the predetermined level. The interruption frequency of the excitation current, however, is not constant in conventional regulator circuits, which may result in certain disadvantages.

FIG. 1 shows a voltage regulator circuit for an AC generator of an automobile. The AC generator or alternator 1 comprises an armature winding 101 and a field winding 102. A full-wave rectifier circuit 2 coupled to the output terminals of the alternator 1 is provided with a main and an auxiliary positive output terminal 201 and 202, and a grounded negative output terminal 203. The voltage regulator circuit 3 has a well-known circuit structure: A voltage divider consisting of serially connected resistors 301 and 302 is coupled across the auxiliary and the negative terminal 202 and 203 of the rectifier circuit 2, the junction between resistors 301 and 302 being coupled to the base of a control transistor 304 through a Zener diode 303. The base of the power transistor 330 coupled in series with the field winding 102 is coupled to the junction between the key switch 5 and an indicator lamp 6 through a resistor 305; the base of the power transistor 330 is also coupled to the collector of a transistor 304 having a grounded emitter. Further, a resistor 335 for supplying initial excitation current from the battery 4 to the field winding 102 is coupled in parallel with the indicator lamp 6. A diode 331 for absorbing and suppressing the surge generated by the inductance of the field winding 102 upon interruption of the field current is coupled across the field winding 102. The circuit for controlling the interruption frequency of the excitation current comprises a serial circuit of a positive feedback resistor 332 and a positive feedback capacitor 333 coupled across the collector of the power transistor 330 and the base of the control transistor 304. A biasing resistor 334 is coupled across the base of the control transistor 304 and the ground level.

The operation of the circuit of FIG. 1 is as follows. When the key switch 5 is closed to start the engine of the automobile, initial excitation current is supplied from the battery 4 to the field winding 102 through the parallel circuit of an indicator lamp 6 and a resistor 335, thereby placing the generator 1 in condition for generating power. At the same time, the indicator lamp 6 is energized to indicate that no voltage is delivered from the generator yet. When the engine is started thereafter to rotate the field winding 102, AC voltages are induced in the armature windings 101 and are rectified by the rectifier 2 into a DC voltage. When the voltage at the positive output terminals 201 and 202 rises to the level of the battery voltage, the lamp 6 is extinguished to indicate that the generation of power has begun properly. Thereafter, the regulation of output voltage is effected as follows. When the output voltage at the auxiliary terminal 202 exceeds a predetermined level to raise the voltage at the junction between resistors 301 and 302 above the Zener voltage, the Zener diode 303 becomes conductive in the reverse direction to turn on control transistor 304, thereby turning off power transistor 330. Conversely, when the output voltage at the auxiliary terminal 202 falls under the predetermined level, the Zener diode 303 regains non-conductivity to turn off control transistor 304, thereby turning on power transistor 330. The interruption frequency of the excitation current in this operation, i.e., the frequency of these repeated turning on and off of power transistor 330, is controlled by the positive feedback circuit time constant which is determined by the resistor 332 and the capacitor 333; more explicitly, the frequency is controlled by the resistance and capacitance values of the RC circuit formed by them.

The voltage regulator shown in FIG. 1, however, has the following disadvantage: Although the interruption frequency of the excitation current is controlled within a certain range by the RC circuit formed by resistor 332 and capacitor 333, it is inevitable that the frequency should vary in a wide range of from about 20 to 500 Hz due to the variation in the rotational speed of the rotor of the generator 1 and in the output voltage thereof. Thus, in cases where the interruption information of the power transistor 330 is to be fed into the microcomputer controlling the operation of the engine, the information must first be processed before being inputted, because of this wide variation of the interruption frequency. Further, if the interruption frequency becomes extremely low and falls to or even under 20 Hz, the fluctuation in the output voltage caused by the interruption of the excitation current results, for example, in a flickering of headlights of the automobile that is readily noticed by the human eye and hence is very unpleasent.

SUMMARY OF THE INVENTION

It is the primary object of this invention therefore to provide a voltage regulator circuit for an AC generator which is characterized by the fact that the interruption frequency of the excitation current supplied to the field winding of the generator is kept constant irrespective of the fluctuations in the operative conditions of the generator such as the rotational speed or the output voltage thereof.

It is an additional object of this invention to provide such a voltage regulator circuit which is simple in structure and reliable in operation, and especially suited for applications to automobiles.

The above objects are accomplished in accordance with the principles of this invention in a voltage regulator circuit for an AC generator which comprises a holding circuit for holding the power transistor in the non-conductive state, and a releasing circuit for releasing the holding action of the holding circuit. The power transistor is coupled in series with the field winding of the generator. Further, an output voltage detector circuit is provided for detecting the output voltage across the output terminals of a rectifier circuit rectifying the AC voltages outputted from the generator. The output voltage detector turns off the power transistor when the output voltage across the output terminals of the rectifier circuit rises above a predetermined level. The holding circuit, on the other hand, holds and retains the power transistor in the non-conductive state after the output voltage across the rectifier circuit falls below the predetermined level, while the releasing circuit releases the holding action of the holding circuit periodically at a predetermined interval, thereby turning on at the end of an interval the power transistor which has been held in the non-conductive state by the holding circuit.

The interruption frequency of the excitation current, i.e., the frequency of the turning on and off of the power transistor, is equal to the frequency of releasing actions of the releasing circuit occurring at said predetermined interval. The reason therefore is as follows: After each releasing action of the releasing circuit, the power transistor becomes conductive and the excitation current is supplied to the field winding of the AC generator, so that the output voltage across the rectifier circuit rises rapidly above the predetermined level in a time shorter than said predetermined interval. The power transistor is thus turned off by the output voltage detector circuit to interrupt the supply of excitation current to the field winding, and the output voltage across the rectifier circuit falls below the predetermined level immediately thereafter. The power transistor, however, is held in the non-conductive state by the holding circuit until the next releasing action of the releasing circuit occurs. Thus, each interval of time between two succeeding releasing actions of the releasing circuit is divided into two portions: in the earlier half the power transistor is conductive and the output voltage across the rectifier circuit rises until it rises above the predetermined level; in the latter half, on the other hand, the power transistor is held in the non-conductive state and the output voltage falls until the releasing action of the releasing circuit occurs. The interruption frequency of the excitation current, therefore, is equal to that of the frequency of the periodical releasing actions of the releasing circuit occurring at a predetermined period.

The holding circuit may include a pair of transistors turned on and off in phase and in antiphase with the power transistor, the transistor in antiphase, when conductive, holding the power transistor in the non-conductive state. The releasing circuit, on the other hand, may include a pulse generator generating trigger pulses periodically at a predetermined interval, and a transistor which is turned on by these trigger pulses to turn off the transistor in antiphase holding the power transistor in the non-conductive state. The output voltage detector circuit may be a conventional one which includes a voltage divider consisting of a serial connector of two resistors coupled across the output terminals of the rectifier circuit, the junction between the two resistors being coupled to the base of a control transistor through a Zener diode which detects the voltage at the junction.

BRIEF DESCRIPTION OF THE DRAWINGS

The novel features which are believed to be characteristic of this invention are set forth with particularity in the appended claims; this invention itself, however, both as to its organization and method of operation, may be best understood from the following detailed description of the preferred embodiments, taken in conjunction with the accompanying drawings, in which:

In the drawings, like reference numerals represent like or corresponding parts or portions.

DETAILED DESCRIPTION OF THE PREFERRED EMBODIMENTS

Figure 1:
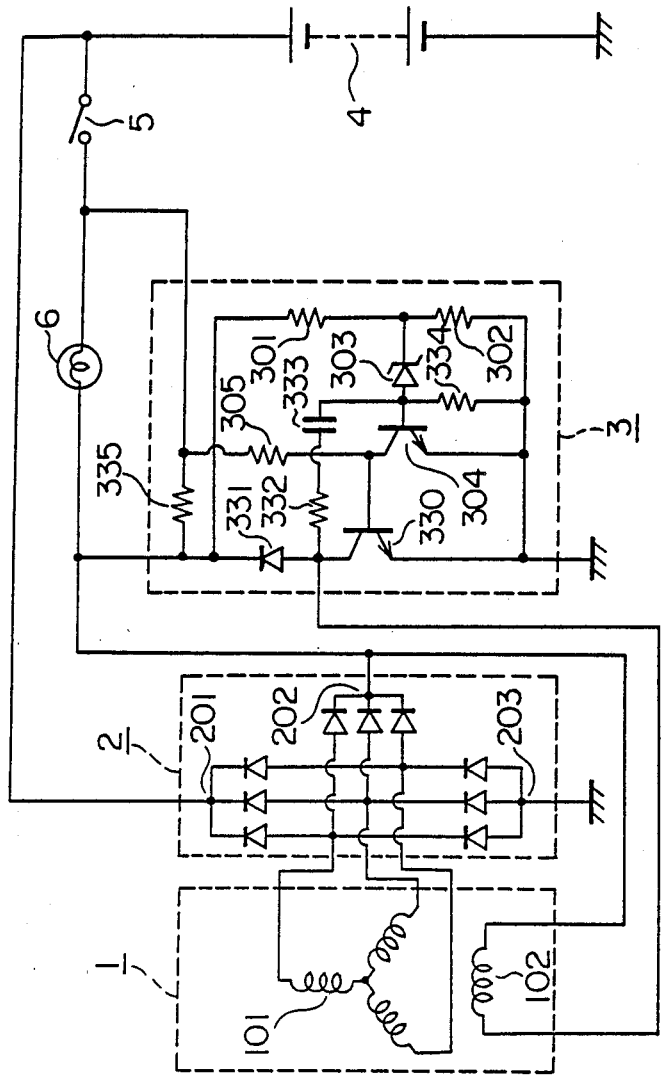
FIG. 1 is a circuit diagram of a voltage regulator circuit for an AC of an automobile.
Figure 2:
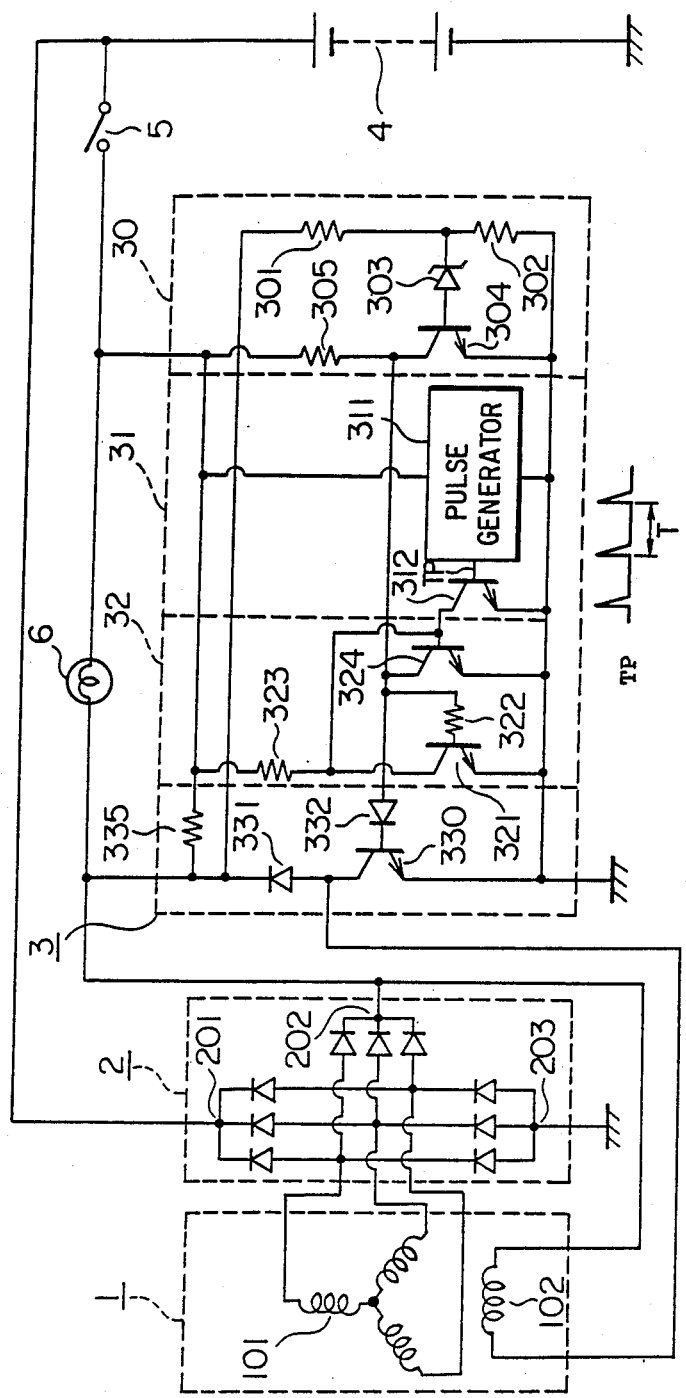
FIG. 2 a circuit diagram of a voltage regulator circuit according to this invention.

Referring now to FIG. 2 of the drawings, an embodiment according to this invention is described. The circuit of FIG. 2 is similar to that of FIG. 1, except for the voltage regulator 3. Thus, the AC generator 1 comprises a stationary armature winding 101 and a field winding 102 mounted on a rotor. The AC voltages induced in the armature winding 101 is rectified by the full-wave rectifier circuit 2 having a main and an auxiliary positive output terminal 201 and 202 and a grounded negative terminal 203. A battery 4 is coupled across the main positive and the negative output terminal 201 and 203 of the rectifier circuit 2. Further, the positive terminal of battery 4 is coupled to the auxiliary terminal 202 through a key switch 5 and an indicator lamp 6. A serial circuit of the field winding 102 and a power transistor 330 is coupled across the auxiliary and the negative terminal 202 and 203.

The voltage regulator 3 according to this invention comprises the following three circuits in addition to the power transistor 330 and other miscellaneous elements: a voltage detector circuit 30, which is similar to that in the voltage regulator of FIG. 1, for detecting the output voltage across the auxiliary and the negative terminal 202 and 203 of the rectifier 2; a holding circuit 32 for holding and retaining the power transistor 330 in the non-conductive state after the output voltage detected by the detector circuit 30 falls from above to under a predetermined level; and a releasing circuit 31 which periodically releases the holding action of the holding circuit 32 at a predetermined interval. Further, as in the case of the regulator of FIG. 1, a resistor 335 is coupled in parallel with the indicator lamp 6 for supplying initial excitation current from battery 4 to the field winding 102, and a diode 331 is coupled across the field winding 102 for absorbing the surge generated at the time of interruption of the excitation current.

The voltage detector circuit 30 comprises a voltage divider consisting of a serial connection of resistors 301 and 302 coupled across the auxiliary terminal 202 and ground. The junction between resistors 301 and 302 is coupled to a control transistor 304 through a Zener diode 303, the forward direction of the Zener diode being directed toward the junction between the resistors 301 and 302. The collector of transistor 304 is coupled through a resistor 305 to an intermediate point between the key switch 5 and the lamp 6, while the emitter thereof is grounded. The junction point between the collector of transistor 304 and resistor 305 is coupled to the base of power transistor 330 through a diode 332 inserted for matching the voltage level, the forward direction of diode 332 being directed toward the base of power transistor 330.

The holding circuit 32 comprises two transistors 321 and 324. The collector of transistor 321, having a grounded emitter, is coupled to an intermediate point between switch 5 and lamp 6 through a resistor 323. On the other hand, the collector of transistor 324, having also a grounded emitter, is coupled, on the other, to the junction point between the collector of transistor 304 and resistor 305. The transistor 321 is turned on and off in phase with the power transistor 330, while transistor 324 is in antiphase with the power transistor 330 and holds the power transistor 330 and transistor 321 in the non-conductive state when it is in the conductive state, as explained below.

The releasing circuit 31 comprises a trigger pulse generator 311 coupled across the junction between switch 5 and lamp 6 and ground to be supplied with an operating voltage, and a holding transistor 312 having a base coupled to the output terminal of the pulse generator 311. The pulse generator 311 generates trigger pulses Tp periodically (rising from the ground level to a positive maximum and then falling to the ground level again immediately thereafter) at a predetermined time interval or period T, which may be equal to about 5 milliseconds. (This type of pulse generator is well-known in the art.) Thus, transistor 312 is periodically turned on for a short interval of time at a period T. The collector of transistor 312 is coupled to the base of transistor 324 and to a junction between the collector of transistor 321 and resistor 323, while the emitter thereof is grounded.

The operation of the circuit of FIG. 2 after the key switch 5 is closed to start the engine is the same as in the case of the circuit of FIG. 1 until the voltage regulator 3 begins to function. Thus, the description thereof will not be repeated here. On the other hand, the voltage regulator 3 according to this invention regulates the output voltage to a predetermined level by repeating the following three steps of operations (a) through (c):

(a) When the output voltage of the rectifier circuit 2 is below the predetermined level, the voltage at the junction between resistors 301 and 302 is not high enough to turn on the Zener diode 303. Thus, transistor 304 of the voltage detector circuit 30 is in the non-conductive state, while the power transistor 330, supplied with the base voltage (from the auxiliary terminal 202 of the rectifier 2 or the positive terminal voltage of the battery 4) through resistor 305, is in the conductive state, to allow the excitation current supplied from the auxiliary terminal 202 of the rectifier 2 (or, at the initial stage, from the battery 4) to flow through the field winding 102. At this time, transistor 321, supplied with the base voltage through resistors 322 and 305, is also in the conductive state, while transistor 324 is in the non-conductive (i.e., non-holding) state, since its base is being held at the ground level by the conductive state of the transistor 321. (The periodical turning-on of transistor 312 caused by the pulses Tp of the pulse generator 311 has no effect in this step of operations (a), since the base of holding transistor 324 is already at the ground level.)

(b) When, on the other hand, the output voltage of the rectifier circuit exceeds the predetermined level, the voltage at the junction between voltage divider resistors 301 and 302 rises to a level high enough to turn on the Zener diode 303 in the reverse direction, thereby turning on transistor 304. Thus, the base voltage of the power transistor 330 falls substantially to the ground level to turn it off. At the same time, transistor 321, having the base thereof coupled to the collector of transistor 304, is turned off, while transistor 324, supplied with the base voltage through resistor 323, is turned on.

(c) When, as a result of the interruption of the excitation current by the non-conductive power transistor 330, the output voltage of the rectifier 2 drops again below the predetermined level to lower the voltage at the junction between voltage divider resistors 301 and 302 below the Zener voltage of diode 303, the Zener diode 303 again becomes non-conductive in the reverse direction to turn off transistor 304. Due, however, to the holding transistor 324 which is in the conductive state, the base voltage of power transistor 330 and transistor 321 is maintained substantially at the ground level even after the control transistor 304 is turned off. Thus, these transistors 330 and 321 are retained in the non-conductive state by the holding transistor 324 until the holding transistor 324 is turned off. On the other hand, the trigger pulse generator 311 is generating a train of positive pulses Tp at a period of T to turn on transistor 312 periodically (for a short period of time during which a pulse is generated) at this time interval T. Thus, when the first pulse Tp is generated by the pulse generator 311 to turn on transistor 312 after the control transistor 304 is turned off, the holding action of transistor 324 is released, i.e., holding transistor 324 is turned off, thereby turning on power transistor 330 and transistor 321 by supplying the base voltage thereto through resistor 305. Thus, the state of the circuit 3 returns to that of the original step (a), and the voltage regulator 3 regulates the output voltage of the rectifier circuit 2 to the predetermined level by repeating the above three steps of operations (a) through (c).

The interruption frequency of the excitation current, i.e., the frequency of the turning on and off of the power transistor 330, in the above described operation of the voltage regulator 3 is equal to the frequency 1/T of the trigger pulses generated by the pulse generator 311. The reason therefor is as follows: Since the RC circuit coupled across the base of control transistor 304 and the collector of power transistor 330 in the circuit of FIG. 1 is dispensed within the circuit of FIG. 2 according to this invention, the natural interruption frequency, i.e., the interruption frequency of the circuit 3 which would result if the holding circuit 32 and the releasing circuit 31 are removed from the circuit, is much greater than the frequency of trigger pulses 1/T. That is, after the output voltage of the rectifier 2 rises above the predetermined level to turn on Zener diode 303 and control transistor 304 in step (b), it falls thereunder immediately after it has risen thereabove, in a very short time compared with the period T of the trigger pulses Tp generated by the pulse generator 311. In other words, the duration of step (b) in which Zener diode 303 and control transistor 304 are turned on is negligibly small. After Zener diode 303 and control transistor 304 are turned off, the power transistor 330 is held in the non-conductive state by the holding circuit 32 until the next trigger pulse Tp is generated by the pulse generator 311. The power transistor 330 is turned on substantially simultaneously with the next generation of a trigger pulse Tp; thereafter, the output voltage of the rectifier returns to and rises above the predetermined level in a time shorter than the period T of the pulses Tp, to turn on the Zener diode 303 and control transistor 304, thereby turning off power transistor 330. The power transistor is held in the non-conductive state until the next pulse Tp is generated by the pulse generator 311. Thus, the whole cycle (a) through (c) above completes in and repeats itself at the period T of the trigger pulses Tp generated by the pulse generator 311.

Each period T between two succeeding pulses Tp is divided into two portions: the earlier half in which the power transistor 330 is in the conductive state, and the latter half in which it is held in the non-conductive state. In the earlier half portion of each period T, the excitation current is supplied to the field winding 102 and the output voltage across the rectifier circuit 2 rises; in the latter half, on the other hand, the excitation current is turned off and the output voltage falls. The proportion of the earlier and the latter half in each period T may change in accordance with the rotational speed of the rotor carrying the field winding 102, etc. The output voltage across rectifier 2 therefore can be regulated to the predetermined level, in spite of the fact that the interruption frequency of the power transistor 330 is determined by the frequency 1/T of the trigger pulses Tp generated by the pulse generator 311.

Although description has been made of a particular embodiment according to this invention, it will be understood that many modifications may be resorted to without departing from the spirit thereof; the appended claims are contemplated to cover any such modifications that fall within the true spirit and scope of this invention.

What is claimed is:

1. A voltage regulator for regulating an output voltage of a rectifier circuit coupled to output terminals of an AC generator including a field winding for generating a magnetic field for inducing AC voltages in an armature winding of the generator, said voltage regulator comprising:
    a power transistor coupled in series with a field winding of an AC generator, said power transistor controlling a supply of excitation current to said field winding by being turned on and off into a conductive and a non-conductive state;
    output voltage detector circuit means coupled across output terminals of a rectifier circuit for detecting an output voltage thereof and turning off said power transistor when said output voltage rises above a predetermined level;
    holding circuit means for holding said power transistor in a non-conductive state after the output voltage of said rectifier circuit detected by said output voltage detector circuit means falls from above to below said predetermined level; and
    releasing circuit means for releasing a holding action of said holding circuit means periodically at a predetermined interval, thereby turning on said power transistor which is held in a non-conductive state by said holding circuit means;
    wherein said power transistor turned on by a releasing action of said releasing circuit means is turned off by said output voltage detector circuit means to lower the output voltage across said output terminals of said rectifier circuit below said predetermined level before a subsequent releasing action of said releasing circuit means occurs, so that a frequency of turning on and off of said power transistor is made equal to a frequency of releasing actions of said releasing circuit means occurring at said predetermined interval.

2. A voltage regulator as claimed in claim 1, wherein said output voltage detector circuit means includes:
    a voltage divider comprising serially connected resistors coupled across said output terminals of said rectifier circuit;
    a serial connection of a resistor and a first transistor coupled across said output terminals of said rectifier circuit, a junction between said first transistor and the resistor coupled in series therewith being coupled to a base of said power transistor; and
    a Zener diode coupled across a junction between resistors of the voltage divider and a base of said first transistor, a forward direction of said Zener diode directed toward said junction between the resistors;
    wherein the output voltage across said output terminals of said rectifier circuit above said predetermined level raises a voltage at said junction between the resistors of the voltage divider to a voltage level high enough to make said Zener diode conductive in a reverse direction, thereby turning on said first transistor.

3. A voltage regulator as claimed in claim 2, wherein said holding circuit means includes:
    a serial connection of resistor and a second transistor coupled across said output terminals of said rectifier circuit, said second transistor having a base coupled to an additional output terminal of said output voltage detector circuit means; and
    a third transistor coupled across the base and an emitter of said power transistor and having a base coupled to a junction between said second transistor and the resistor coupled in series therewith;
    whereby said second and third transistors are turned on and off in phase and in antiphase with said power transistor, respectively, and said third transistor holds said power transistor in the non-conductive state after said Zener diode becomes non-conductive in the reverse direction and said first transistor is turned off.

4. A voltage regulator as claimed in claim 3, wherein said releasing circuit means includes:
    trigger pulse generator means for generating trigger pulses of short duration periodically at the predetermined interval; and
    a fourth transistor having a base supplied with said trigger pulses generated by said trigger pulse generator means, said fourth transistor being coupled across the base and an emitter of said third transistor of the holding circuit means;
    whereby said fourth transistor is turned on for a short duration periodically at said predetermined interval by said trigger pulses generated by said trigger pulse generator means, thereby turning off said third transistor holding the power transistor in the non-conductive state at an end of each interval to turn on said power transistor.

* * * * *